May 11, 1965 R. P. BONEWITS 3,182,697
SCREW RETAINING DEVICE FOR SCREWDRIVER
Filed Jan. 29, 1964

INVENTOR.
BY R.P. BONEWITS 3,182,697
SCREW RETAINING DEVICE FOR SCREWDRIVER
Robert P. Bonewits, R.R. 2, Greenwood, Ind.
Filed Jan. 29, 1964, Ser. No. 341,013
1 Claim. (145—50)

This invention relates to a screwdriver attachment for mounting on the shank of a conventional screwdriver comprising a retaining device for clamping a screw in a driving position with respect to the screwdriver bit in a positive manner. The device features means to maintain the screw receiving slot in the retaining device in a fixed position with respect to the screwdriver bit. Adjustment of the retainer to clamp or release the screw is obtained by rotating a nut member to axially adjust the retainer with respect to the screwdriver shank. This arrangement facilitates the loading and unloading of screws in the device and is accomplished with a minimum of parts such that the device is inexpensive to manufacture.

The primary object of the invention is to provide a screw retaining device that is rotatively fixed and axially adjustable on a screwdriver shank.

In the following detailed description of the invention, reference is had to the accompanying drawing which forms a part hereof. Like numerals refer to like parts in all views of the drawing and throughout the description.

Figure 1:
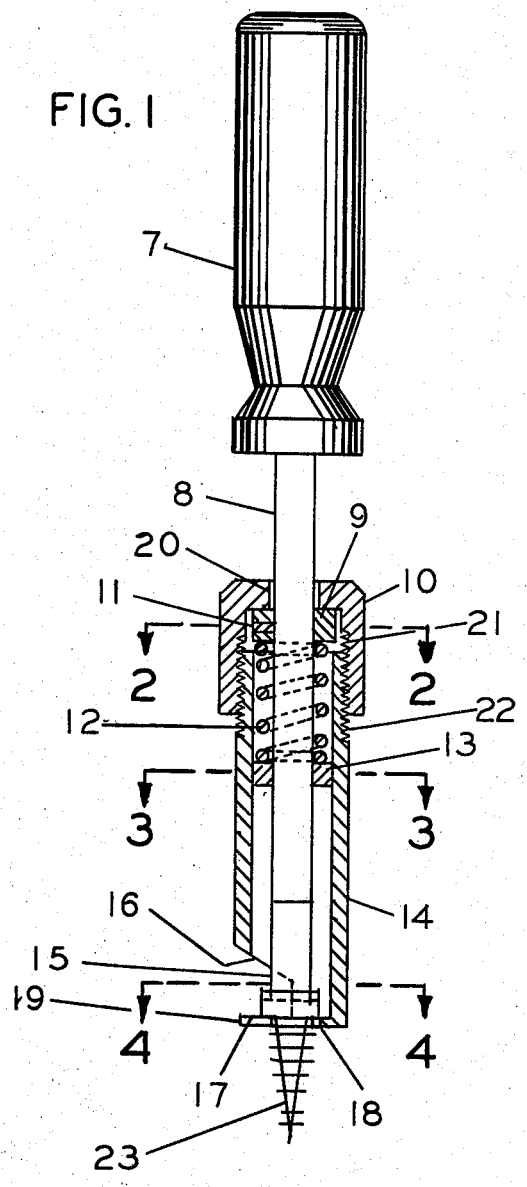
FIGURE 1 is a longitudinal cross sectional view of the invention with a screw in position therein.
Figure 2:
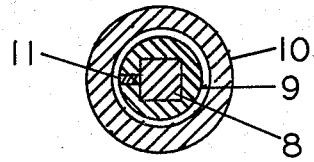
FIGURE 2 is a sectional view taken on line 2—2 of FIGURE 1.
Figure 3:
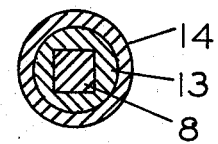
FIGURE 3 is a sectional view taken on the line 3—3 of FIGURE 1.
Figure 4:
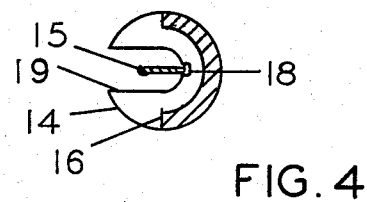
FIGURE 4 is a sectional view taken on line 4—4 of FIGURE 1.

In the drawing, the handle of a conventional square screwdriver is indicated at 7 with a shank portion 8 and a bit 15.

The retainer or clamping device is designed to be assembled over the shank 8 of the screwdriver and retained thereon by the abutment of co-acting parts.

The clamping device utilizes a cylindrical tubular member 14 having a scarved off or cut-out portion 16 in one side thereof adjacent one end. The end portion of the remaining depending wall portion is bent transversely of the tube bore, trimmed and provided with a screw receiving slot 17 to form a screw seating portion 19 and a small slot portion 18 at the back of the seat portion 19 to permit the screwdriver bit portion 15 to extend thru the seating portion. The opposite end of the member 14 is provided with external threads 22. A cap member 10 having internal threads 21 threadedly engages the threads 22 on member 14. The cap member 10 is provided with a central bore 20 thru which the shank 8 of the screwdriver may pass. A guide collar 13 having a central opening to receive the shank 8 is secured internally of the member 14 by an interfence fit or by a pin. The collar 13 serves to positively locate the screwdriver bit with respect to the screw receiving slot 17 and serves as a drive coupling therebetween to insure that the retainer rotates with the screwdriver shank. If other than a square screwdriver shank is used an appropriate flat may be provided by grinding or filing. An abutment member 9 is secured to the shank 8 of the screwdriver by a set screw 11 threaded thru a bore in the member 9. A resilient spacer member of spring 12 is provided to be mounted over the shank 8 between the retainer collar member 13 and the abutment member 9 that is secured to the shank 8.

Figure 5:
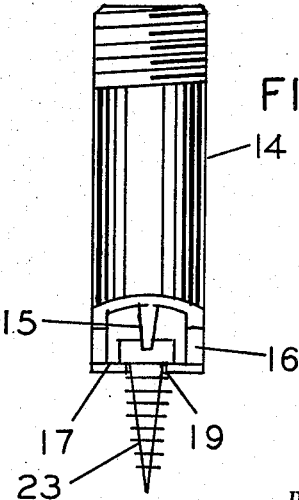
FIGURE 5 is a side elevation of the invention showing a screw positioned therein.

To assemble the retaining device on a conventional screwdriver the nut member 10 is assembled over the shank 8 and positioned adjacent the handle portion 7. The abutment 9 is assembled over the shank 8 followed by the resilient spacer or spring 12. The tubular member 14 with guide collar 13 secured therein is then assembled over the shank 8 and is used to push the spacer 12 and abutment 9 up the shank 8 until the bit 15 appears at approximately at the mid-point of the opening or scarved out portion 16 with the bit 15 aligned with slot 17 as shown in FIGURE 5 of the drawing. This positions the device for use and the set screw 11 in the abutment 9 is tightened against the shank 8 to secure the elements together. The nut 10 is then threaded over the member 14 into abutting relationship with the member 9. This places the device approximately at the mid-point of its adjustment range and is readily operative, with small additional adjustment, with most common screws.

The clamping action of the device, with a screw in position, is obtained by rotating the nut 10 to adjust the distance between the top of the abutment 9 and the top surface of the seating portion 19. It is apparent that the resilient member or spring 12 is compressed between the member 13 and the member 9. For this reason, it is preferred that the spring 12 be very light so as not to exert a force that will impede the adjustment of the device. Inasmuch as the spring 12 is intended primarily as a spacer to aid in the assembly of the device it may, if desired, be omitted from the assembly without affecting the operation thereof.

It is understood that modifications within the scope of the appended claim may be made in the design and arrangement of the parts without departing from the spirit and scope of the invention.

What is claimed is:

I claim:

A screw clamping device adapted for mounting over the shank of a screwdriver comprising an abutment element secured to the screwdriver shank, a cylindrical member having a screw seating portion at one extremity and a rotatable element at the other mounted over said shank and abutment member, said rotatable element engaging the abutment member and serving to axially alter the position of said cylindrical member with respect to the screwdriver shank and means secured internally of said cylindrical member and abutting the screwdriver shank to provide a positive drive connection therebetween.

References Cited by the Examiner
UNITED STATES PATENTS 2,709,466  5/55  Ferrara.
2,884,971  5/59  Dierker _____ 145—52

References Cited by the Applicant
UNITED STATES PATENTS 1,159,016  11/15  Gibson.
1,810,704   6/31  Gentry.
2,221,325  11/40  Holman.
2,536,191   1/51  Lewis.
2,620,000  12/52  Noffsinger.
2,709,466   5/55  Ferrara.
2,756,791   7/56  Ferrara.

WILLIAM FELDMAN, *Primary Examiner.*